United States Patent
Zhao et al.

(10) Patent No.: US 12,136,831 B2
(45) Date of Patent: Nov. 5, 2024

(54) LASER WIRELESS POWER TRANSMISSION DEVICE AND METHOD BASED ON POWER ACQUISITION ON POWER LINES

(71) Applicants: State Grid Jiangsu Electric Power Co., LTD, Nanjing Power Supply Branch, Jiangsu (CN); State Grid Jiangsu Electric Power Co., LTD, Shuangchuang Center, Jiangsu (CN); State Grid Jiangsu Electric Power Co., LTD, Jiangsu (CN)

(72) Inventors: Xuan Zhao, Jiangsu (CN); Yang Liu, Jiangsu (CN); Yanjun Jiao, Jiangsu (CN); Yongqiang Wang, Jiangsu (CN); Meng Zhang, Jiangsu (CN); Honghua Xu, Jiangsu (CN); Chong Peng, Jiangsu (CN); Huan Zhang, Jiangsu (CN); Jian Yang, Jiangsu (CN)

(73) Assignees: State Grid Jiangsu Electric Power Co., LTD. Nanjing Power Supply Branch, Nanjing (CN); State Grid Jiangsu Electric Power Co., LTD. Shuangchuang Center, Nanjing (CN); State Grid Jiangsu Electric Power Co., LTD, Nanjing (CN)

(*) Notice: Subject to any disclaimer, the term of this patent is extended or adjusted under 35 U.S.C. 154(b) by 95 days.

(21) Appl. No.: 18/164,859

(22) Filed: Feb. 6, 2023

(65) Prior Publication Data

US 2024/0006925 A1    Jan. 4, 2024

(30) Foreign Application Priority Data

Jul. 1, 2022   (CN) .......................... 202210765232.0

(51) Int. Cl.
   *H02J 50/30*   (2016.01)
   *H02J 50/80*   (2016.01)
   *H02J 50/90*   (2016.01)
(52) U.S. Cl.
   CPC .............. *H02J 50/30* (2016.02); *H02J 50/80* (2016.02); *H02J 50/90* (2016.02)
(58) Field of Classification Search
   CPC ....................................................... H02J 50/30
   USPC ........................................................ 307/104
   See application file for complete search history.

(56) References Cited

U.S. PATENT DOCUMENTS

| 2018/0136335 A1* | 5/2018 | Kare ....................... G01S 7/003 |
| 2020/0244374 A1* | 7/2020 | Alpert ..................... H02J 50/80 |
| 2020/0336017 A1* | 10/2020 | Youn ....................... H02J 50/90 |

* cited by examiner

Primary Examiner — Joseph Chang
(74) Attorney, Agent, or Firm — Maier & Maier, PLLC

(57) ABSTRACT

A laser wireless power transmission device and method based on power acquisition on power line. The device includes a power transmitter and a power receiver both installed on a power transmission line. The power transmitter includes an online induction power acquisition module, a semiconductor laser, a communication module, a two-dimensional pan-tilt, a beam shaping module, a control unit, a video image module, and an IMU module. The power receiver includes a four-quadrant photovoltaic panel, a DCDC module, a wireless monitoring module, and a battery.

10 Claims, 3 Drawing Sheets

LASER WIRELESS POWER TRANSMISSION DEVICE AND METHOD BASED ON POWER ACQUISITION ON POWER LINES

RELATED APPLICATIONS

The present disclosure claims the benefit of priority to CN Patent Application No. 202210765232.0, filed Jul. 1, 2022, and entitled "A laser wireless power transmission device and method based on power acquisition on power lines" the entire contents of each of which are incorporated herein by reference.

TECHNICAL FIELD

The present disclosure is related to the technical field of power or electricity transmission equipment, and particularly relates to a laser wireless power or electricity transmission device and method based on power or electricity acquisition from power transmission lines.

BACKGROUND

Online monitoring technology of overhead transmission lines is a critical method to ensure the normal operation of transmission lines in real time. On overhead transmission lines, most of the online monitoring devices are installed on towers and powered by solar energy and storage batteries. In actual working scenarios, due to the rainy weather continuing for a long time or the high-power consumption of the equipment itself, the power supply system may not receive solar energy charging for a long time, resulting in the shutdown of the system due to power shortage. In some critical online monitoring scenarios, it will lead to serious problems, for example, the shutdown of the anti-explosive visual monitoring device in high-risk areas or anti-external breach device based on lidar, etc. At present, the CT (Current Transformer) online power supply technology is becoming more and more mature, and devices installed on overhead transmission lines may obtain energy supply through the CT (Current Transformer) power supply continuously. However, considering the insulation safety requirements, the online CT power supply technology cannot directly supply power to the devices on electric towers. Currently, there are some late-model insulator products those can take power on lines and supply power to a tower from the inside, but the penetration rate of the products is still relatively low, and the technology can't be achieved on most power lines so far.

The existing disclosure 1 (CN 108667160 A) discloses the technology of a superconducting laser wireless power supply device for shared towers, which comprises: Laser transmitters, laser matrix, and photovoltaic panels, wherein: the laser matrix has laser channels, the laser output ends of the laser transmitter are fixedly connected with the laser channels' entrance of the laser matrix, and output ends of the laser channels' of the laser matrix is facing the face of the photovoltaic panel receiving the laser light signals. The existing disclosure 1 converts electrical energy into light energy by connecting the laser transmitters directly with the ultra-high voltage transmission line, the laser generated in the laser transmitters is dispersed by the laser matrix, and the laser is transmitted to the photovoltaic panel, the photovoltaic panel converts light energy into electrical energy; and the laser has the characteristics of great monochromaticity, high brightness, and good coherence that other light sources do not have. The photovoltaic panels have high efficiency of converting light energy into electrical so that to realize wireless power supply for devices in other industries those are attached to power towers. The disadvantage of the technology in this disclosure is that the laser transmitter is directly connected to the ultra-high voltage transmission lines, and the superconducting energy storage, superconducting electron restraint, and free electron laser generator are used to generate laser light. The laser system is difficult to achieve in practice, and the mature commercial products has not been available in market. Moreover, the cost of the products is high, the conversion efficiency is uncertain, there is no design in terms of aiming at photovoltaic panels, and furthermore there are issues during installation and use.

The existing disclosure 2 (CN 206293958U) discloses technology of a laser photovoltaic power supply device for wind direction and wind speed monitoring station, the method is characterized in that it comprises a laser transmitter module, a photovoltaic power supply module, wherein: the laser transmitter module includes a laser, a sighter, a beam collimation and orientation device, and a beam orientation platform. Specially, the laser, the sighter, and the beam collimation and orientation device are connected in sequence and installed on the beam orientation platform. The photovoltaic power supply module includes a laser photovoltaic cell, a rectifier voltage regulator circuit, and a storage battery. The laser photovoltaic cell receives the laser beam emitted by the laser transmitter module and converts the laser beam into electrical energy, and the laser photovoltaic cell is connected to the rectifier voltage regulator circuit and the storage battery in sequence. The disadvantage of the disclosure 2 is that the laser photovoltaic power supply device of the disclosure 2 uses 220V mains or city electricity power supply, and the device is a mobile power supply device. It is mainly to meet the temporary power supply needs of some devices but cannot meet the emergency power supply needs of online devices of power lines and towers, so the technology of the disclosure 2 can't fix the technology issues of power supply on power lines. In addition, the existing disclosure 2 adopts laser collimation output, and the light spot size cannot be adjusted; and the electro-optical conversion efficiency is low by adopting diode-pumped solid-state laser; when aiming, the entire laser needs to be rotated, which is more complicated and unreliable.

SUMMARY

To resolve the deficiencies in existing technologies, the purpose of the present disclosure is to provide a laser wireless power transmission device and method based on power taking on lines, so that to solve the technology problems that the online monitoring devices or other devices installed on towers unable to obtain solar power in extreme weather or under other extreme scenarios.

To achieve the above goals, the present disclosure adopts the following technical solutions:

A laser wireless power transmission device based on power acquisition on power lines, the device includes a power transmitter and a power receiver;

the power transmitter, hanging on a power transmission line, includes an on line induction power acquisition module, a semiconductor laser, a communication module, a two-dimensional pan-tilt, a beam shaping module, and a control unit;

the on line induction power acquisition module, fixed on the power transmission line for induction power acquisition, supplies power for the power transmitter; the semiconductor laser emits a laser beam from a fiber output head and the beam shaping module to a four-quadrant photovoltaic panel at the power receiver via a coupling optical fiber; the optical fiber output head and the beam shaping module are arranged on the two-dimensional pan-tilt fixedly; the beam shaping module has a video image module and an IMU module fixedly positioned thereon; the control unit connects with the on line induction power acquisition module, the semiconductor laser, the communication module, the two-dimensional pan-tilt, the beam shaping module, the video image module, and the IMU module so as to realize laser wireless power transmission control.

The power receiver, installed on a tower, includes the four-quadrant photovoltaic panel, a DCDC module, a wireless monitoring module, and a tower end battery.

An output end of the power supply of the four-quadrant photovoltaic panel connects to an input end of the battery via the DCDC module, and an output end of the battery connects to the electric device.

The wireless monitoring module real-time monitors of an output voltage of the tower end battery and an outputs current of each quadrant of the four-quadrant photovoltaic panel.

The beam shaping module is composed of optical lenses and also is provided with a safety management module.

The safety management module monitors areas containing a laser beam when the semiconductor laser turned on; when the safety management module detects a person entering the monitoring areas, an alarm will be issued, and the control unit controls the semiconductor laser to stop emitting laser and allows laser to be emitted continuously and power charge until the person exits the monitored areas.

The control modes of the working state of the semiconductor laser includes:
  i. manually controlling the semiconductor laser to be turned on or off;
  ii. the control unit automatically controlling the semiconductor laser to be turned on or off based on the real-time monitoring data of the wireless monitoring module or preset charging and power supply time information;
  iii. the control unit monitoring the safety conditions of the external environment through the safety management module, and automatically controlling the semiconductor laser to be turned on or off according to the safety conditions of the external environment;

Optionally, an internal optical axis of the video image module is parallel to the output optical axis of the semiconductor laser; a center of the image field of view has a cross or other mark, and the video image module is connected to the control unit through a signal line.

the IMU module is installed and fixed near the output end of the beam shaping module and is connected to the control unit through a signal line for measuring and recording the spatial motion and position of the device's components.

Optionally, the four-quadrant photovoltaic panel is composed of four photovoltaic panels, which are positioned according to the positions of four quadrants, spliced together; the current of each of the four quadrants is output to the DCDC module separately, and a coordinate scale of an actual length is marked on center lines of the four-quadrant photovoltaic panel.

The present disclosure provides a method for laser wireless power transmission based on power acquisition on power lines, comprising:
  Step 1: manually controlling the rotation of the two-dimensional pan-tilt, so that the center of the video image field of view be aligned with the preset position on the four-quadrant photocell panel;
  Step 2: adjusting the position of the internal lens of the beam shaping module, changing the laser spot size of the power receiver, and adjusting and enlarging the laser spot to basically cover the four-quadrant photovoltaic panel;
  Step 3: calculating, by the control unit, the output current difference of each quadrant of the four-quadrant photocell panel in real time according to the PID algorithm and adjusting the rotation angle of the two-dimensional pan-tilt so that the center of the laser spot be focused on the center of the four-quadrant photocell panel, and recording the spatial position information of the device's components;
  Step 4: after completing the pre-adjustment of steps A to C, the device enters a normal state, the semiconductor laser is turned off, and other device components are turned on. When the power supply conditions are met, the semiconductor laser is turned on for wireless power supply.

Optionally, the Step 1 further including:
Installing the device, manually connecting to the transmitter remotely, turning on the semiconductor laser and other device components, obtaining the video image captured by the current video image module, manually controlling the rotation of the two-dimensional pan-tilt, so that the cross mark representing the center of the image field of view is aligned with a scale d on the lines between the first and second quadrants on the quadrant photovoltaic panel, and d represents the actual distance between the optical axis of the video image module and the output optical axis of the semiconductor laser.

in Step 2, wherein adjusting of the spot further including:
method I. automatically adjusting, according to lens position calculated by theoretical simulation and a manually measured distance L between the power receiver and the power transmitter; the distance L between the power receiver and the power transmitter refers to the distance between the position of the rotation center of the semiconductor laser 102 driven by the two-dimensional pan-tilt 104 and the center of the four-quadrant photovoltaic panel 201;
method II. observing an infrared spot through the video image module, manually adjusting the position of the internal lens of the beam shaping module, changing the size of the laser spot at the power receiver, and adjusting and enlarging the laser spot to cover the four-quadrant photovoltaic panel;
the laser spot adjustment can be achieved by either one of the above-mentioned I or II.

In Step 3, turning on the semiconductor laser, and then the semiconductor laser 102 emits a laser beam, which is coupled by the optical fiber and then enters the beam shaping module from the optical fiber output head, and then irradiates the four-quadrant photocell panel after beam shaping;

After the four-quadrant photovoltaic panel is irradiated by the laser, the four quadrants start to output current, and the output current of each of the four quadrants 1 to 4 are recorded as $I_1, I_2, I_3, I_4$.

The wireless monitoring module monitors $I_1, I_2, I_3, I_4$, and transmits $I_1, I_2, I_3, I_4$ to the control unit at the power transmitter in real time; the control unit uses the PID algorithm to calculate the output current difference of each quadrant of the four-quadrant photovoltaic panel in real time, and adjusts the rotation of the two-dimensional pan-tilt in real time; by adjusting the direction of the two-dimensional pan-tilt, the control unit drives the beam shaping module to rotate, and then change the direction of laser irradiation, so that the center of the laser spot is positioned at the center of the four-quadrant photovoltaic panel, and the IMU module records the spatial position information of the component at the moment.

Optionally, In Step 3, adjusting the rotation angle of the two-dimensional pan-tilt further including:

Step 3.1: Calculating the adjustment parameter k:

$$k=I/P;$$

Wherein, P represents the maximum laser power of the semiconductor laser;

the definition and determination method of I are:

when the power transmission line is stable, manually locating and aiming the center of the four-quadrant photovoltaic panel through the video image, adjusting the beam shaping module so that the laser spot covers the four-quadrant photovoltaic panel, and adjusting the laser power of the semiconductor laser to the maximum value P, and then the total output current I of the four-quadrant photovoltaic panel at this time is measured;

Step 3.2: when the center of the laser spot is irradiated on the center of the four-quadrant photovoltaic panel, based on the PID algorithm, comparing and calculating the value of $\Delta I = I_1 - I_2$; when $\Delta I > 0$, the two-dimensional pan-tilt rotates to left, i.e. rotates to in the first quadrant, otherwise, rotates to right, i.e. rotates to in the second quadrant;

when the power transmitter moves, and needs to track and aim at the center of the four-quadrant photovoltaic panel, according to the relationship between the theoretical rotation angle $\Delta\theta$ and the current difference $\Delta I$, $\Delta\theta = \Delta I/kL$, applying the PID algorithm to gradually adjust the rotation angle of the two-dimensional pan-tilt to reduce the value of $\Delta I$. When $\Delta I \leq k$, the irradiation areas of the 1st quadrant and the 2nd quadrant are equal, and the laser irradiation area maintains consistent in the left direction and right direction;

wherein L is the distance between a position of the center of rotation of the semiconductor laser driven by the two-dimensional pan-tilt and the center of the four-quadrant photovoltaic panel;

Step 3.3: when the center of the laser spot is irradiated on the center of the four-quadrant photovoltaic panel, compare and calculate the value of $\Delta'I = I_3 - I_2$, when $\Delta'I > 0$, the two-dimensional pan-tilt rotates upward, otherwise, the two-dimensional pan-tilt rotates downward;

when the power transmitter moves, and needing to track and aim at the center of the four-quadrant photovoltaic panel, according to the relationship between the theoretical rotation angle $\Delta\theta$ and the current difference $\Delta'I$, $\Delta\theta = \Delta'I/kL$, applying the PID algorithm to gradually adjust the rotation angle of the two-dimensional pan-tilt to reduce the value of $\Delta'I$; when $\Delta'I \leq k$, it is considered that the irradiation areas of the third quadrant and the second quadrant are considered as being equal, and the laser irradiation area maintains consistent in the upward and downward directions, so as to achieve tracking and aiming at the center of the four-quadrant photovoltaic panel.

Optionally, the satisfactory conditions satisfying for power supply in Step 4 are:

a. the device monitors the safety of the external environment via the safety management module, and the semiconductor laser is turned on via manually controlling;

b. the device monitors the safety of the external environment via the safety management module and monitors that the voltage of the battery and the battery current of the four-quadrant photovoltaic panel are lower than the user's set value or are in the period of charging and power supply;

if either of the above-mentioned a or b is satisfied, it means that the power supply condition is met.

In Step 4, after the semiconductor laser is turned on, the semiconductor laser emits a laser light beam, and irradiates the laser light beam from the optical fiber output head to the center of the four-quadrant photovoltaic panel after coupling through a fiber;

the four-quadrant photovoltaic panel receives the laser light and outputs current, and the DCDC module rectifies and boosts or bucks the output power of the four-quadrant photovoltaic panel to ensure that the voltage is regulated output to the battery for charging, and the battery stores electrical energy and supplies power to the electrical equipment;

the wireless monitoring module monitors the voltage of the battery on the tower and the current of the four-quadrant photovoltaic panel in real time;

when the power supply conditions are no longer met, turning off the semiconductor laser.

Optionally, in Step 4, when the semiconductor laser is turned on, and when the power line waves or the wind deflects to drive the power transmitter to move, causing the laser spot to move or deviate from the four-quadrant photovoltaic panel, which affects the laser function or even causes laser danger, return to Step 3 to make the center of the laser spot is always in the center of the four-quadrant photovoltaic panel to realize dynamic tracking and irradiation;

when the semiconductor laser is turned off, the automatic tracking irradiation function terminates due to the loss of the real-time output current data of the four-quadrant photovoltaic panel;

when it is necessary to track again, the spatial position information of the components recorded by the IMU module is retrieved when the center of the laser spot is in the center of the four-quadrant photovoltaic panel, and then to calculate the spatial position of the four-quadrant photovoltaic panel;

the four-quadrant photovoltaic panel can be captured again through the rotation of the two-dimensional pan-tilt, and the tracking and aiming can be realized again by repeating Step 3.

The technology effects of the present disclosure, compared with the existing technologies, as listed as follows:

This disclosure resolves the problem that the online monitoring devices on towers cannot obtain solar power under extreme conditions. By obtaining power on lines through CT (current transformer), and laser transmitting power wirelessly, so that the method and device of the present disclosure avoid potential power safety hazard. The method and device set up a safety management and control module for monitoring and protection, so that the method or device immediately stop emitting light to ensure personnel safety when a person climbs the tower. The method or device apples video images to realize manual observation and pre-aiming, and apples real-time monitoring of the status of the four-quadrant photovoltaic panel power supply system through the wireless monitoring module so as to supply power on demand. Furthermore, the method and device of the present disclosure apply fiber-coupled semiconductor lasers and fiber-optic heads to make the launch head be lighter, more convenient, easier to adjust, and lower cost. The method and the device adopt four-quadrant photocell panel scheme to make aiming more precise and easier and achieve dynamic tracking aiming so that to avoiding aiming deviation caused by wind deflection and galloping. In the present disclosure, the user can also set the timing to turn on the semiconductor laser for charging and power supplying, for example, charging and supplying power during the low power consumption period at night to save costs.

Compared with the prior disclosure 1, the improvements of the method and device of the present disclosure lie in: applying a fiber-coupled semiconductor laser, wherein the laser transmitting head is a fiber-optic head; adopting a video image to realize manual pre-targeting, and adopting a four-quadrant photocell panel to realize aiming and tracking aiming, which is practical and feasible, high conversion efficiency, low cost, small size and light weight, simple, flexible, and accurate for installation and aiming; applying inertial measurement unit (IMU) to record the spatial position and provide position reference during recapture.

Compared with the prior disclosure 2, the improvements of the method and device of the present disclosure lie in: applying the high-voltage transmission line CT (current transfers) to obtain power and supply energy, applying the energy of the power transmission lines directly to supply power for the laser, and transmitting the power wirelessly to the tower through the laser, wherein using optical-fiber coupled semiconductor laser to output emission through optical fiber, and the transmitter part of the laser is lighter and easier to adjust; adopting the beam shaping module which may adjust light spots so that to adjust the area irradiated on the four-quadrant photocell board, which is suitable for different distances and photocell sizes and may make full use of the photocell; using video images to realize manual pre-aiming, and adopting a four-quadrant photocell panel scheme, so that the aiming is more convenient and accurate to realize automatic tracking and aiming under the states of wind deflection and galloping.

DETAILED DESCRIPTION

The present disclosure will be further described below with the accompanying drawings. The following examples are only used to illustrate the technical solutions of the present disclosure more clearly, but not limit the protection scope of the present disclosure.

Figure 1:
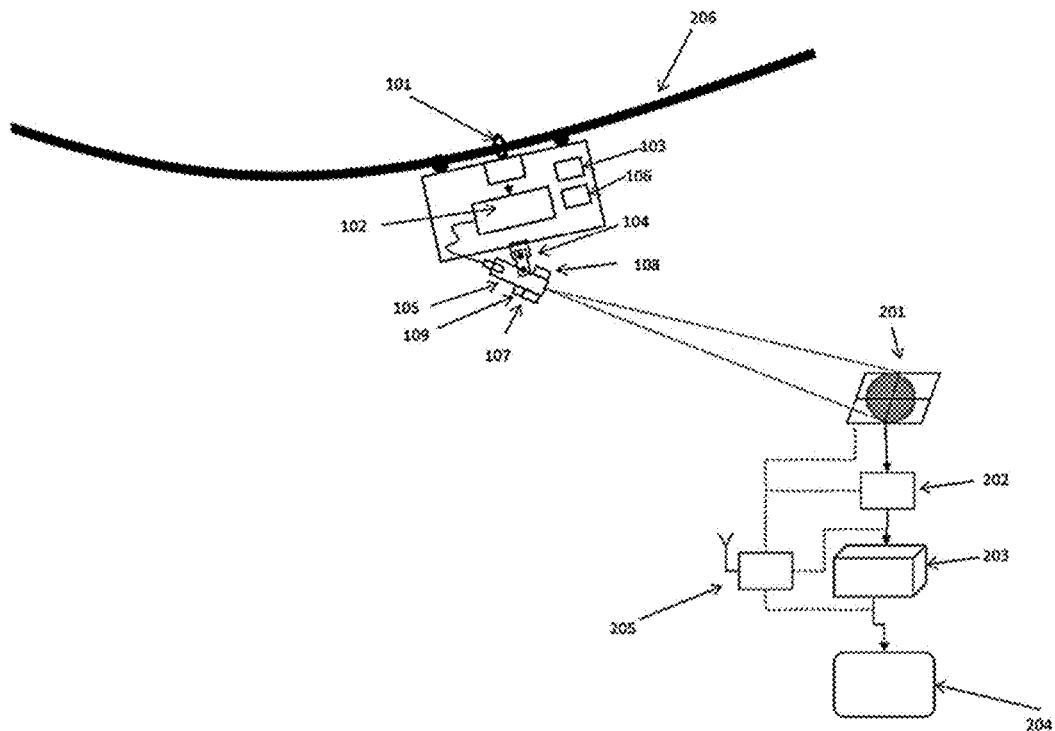
FIG. 1 is a schematic structural diagram of a laser wireless power transmission device based on power acquisition from lines, according to exemplary examples of the present disclosure.

As shown in FIG. 1, Embodiment 1, which is one of exemplary embodiments of the present disclosure, provides a laser wireless power transmission device based on power acquisition on power lines, the device includes a power transmitter and a power receiver, optionally but not limited, the power transmitter is hung on the power transmission line 206, furthermore the laser wireless power transmission device includes an on line induction power acquisition module 101, a semiconductor laser 102, a communication module 103, a two-dimensional pan-tilt 104, a beam shaping module 105, and a control unit 106;

Explanation of symbols in attached drawing 1: 101—induction power acquisition module, 102—semiconductor laser, 103—communication module, 104—two—dimensional pan—tilt, 105—beam shaping module, 106—control unit, 107—safety management module, 108—Video image module, 109—IMU module; 201—four—quadrant photovoltaic panel, 202—DCDC module, 203—battery, 204—electrical equipment, 205—wireless monitoring module, 206—power transmission line.

The on line induction power acquisition module 101 is fixed on the power transmission line 206 for induction power acquisition to supply power for the power transmitter. The semiconductor laser 102 emits a laser beam from the fiber output head and the beam shaping module 105 to the four-quadrant photovoltaic panel 201 at the power receiver through the coupling optical fiber. The optical fiber output head and the beam shaping module 105 are fixedly arranged on the two-dimensional pan-tilt 104. The beam shaping module 105 has a video image module 108 and an IMU module 109 fixedly positioned thereon. The control unit 106 is connected with the on line induction power acquisition module 101, the semiconductor laser 102, the communication module 103, the two-dimensional pan-tilt 104, the beam shaping module 105, the video image module 108, and the IMU module 109 so as to realize laser wireless power transmission control, including to remote human-computer interaction, data information and command processing, control semiconductor laser 102 to turn on or off, and adjust the steering of two-dimensional pan-tilt 104, adjust the beam shaping module 105, and make the laser real-time automatic tracking and alignment irradiating four-quadrant photovoltaic panel 201, etc.

The power receiver is installed on the tower and includes the four-quadrant photovoltaic panel 201, the DCDC module 202, the wireless monitoring module 205, and the tower end battery 203.

The output end of the power supply of the four-quadrant photovoltaic panel 201 is connected to the input end of the battery 203 through the DCDC module 202, and the output end of the battery 203 is connected to the electrical equipment 204.

The wireless monitoring module 205 is used for real-time monitoring of the output voltage of the tower end battery 203 and the outputting current of each quadrant of the four-quadrant photovoltaic panel 201.

Further preferably, the on line induction power acquisition module 101 is a CT induction power acquisition device installed on the power transmission line 206, and the CT induction power acquisition device is clamped and fixed on the power transmission line to obtain electric energy or power through electromagnetic induction.

The semiconductor laser 102 includes a near-infrared semiconductor laser and is fixed on the power transmission line 206 by a mechanical clamp. The optical fiber output head is integrated at the end of the light-guiding optical fiber, and the output end of the semiconductor laser 102 is fixedly connected to the input end of the beam shaping module 105.

The control mode of the working state of the semiconductor laser 102 includes:

A). manually controlling the semiconductor laser 102 to be turned on or off;

B). the control unit 106 automatically controlling the semiconductor laser 102 to be turned on or off based on the real-time monitoring data of the wireless monitoring module 205 or preset charging and power supply time information;

C). the control unit 106 monitoring the safety conditions of the external environment through the safety management module 107, and automatically controlling the semiconductor laser 102 to be turned on or off according to the safety conditions of the external environment.

The internal optical axis of the video image module 108 is parallel to the output optical axis of the semiconductor laser 102. The center of the image field of view has a cross or other marks, and the video image module 108 is connected to the control unit 106 through a signal line.

The IMU module 109 is installed and fixed near the output end of the beam shaping module 105 and is connected to the control unit 106 through a signal line for measuring and recording the spatial motion and position of the laser wireless power transmission device's components.

The beam shaping module 105 is composed of 5 optical lenses, which realizes shaping the laser output from the fiber optic head and can adjust the divergence angle of the laser beam so that it can fully irradiate the four-quadrant photocell panel 201 and make the four-quadrant photocell panel 201 output maximum current.

The beam shaping module 105 is also provided with a safety management module 107, and the safety management module 107 monitors the areas containing the laser beam when the semiconductor laser 102 is turned on. When it is detected that a person enters the monitored areas, an alarm is issued, and the control unit 106 controls the semiconductor laser 102 to stop emitting laser and allow laser to emit continuously and power charge until the person exits the monitored areas.

The safety management module 107 monitors the areas including the laser beam by means of human body infrared induction sensing, video image monitoring, or microwave radar monitoring, and detects whether a person enters the monitored areas.

The two-dimensional pan-tilt 104 is a light high-speed two-dimensional pan-tilt 104, which is used to drive the beam shaping module 105 and components fixed thereon to rotate and so that to change the laser irradiation direction.

The communication module, which could be WIFI, Bluetooth, Zigbee, NB-IoT and other communication methods, provides wireless communication functions for the laser wireless power transmission device.

The four-quadrant photovoltaic panel 201 is composed of four photovoltaic panels, which are positioned according to the positions of four quadrants, spliced together. The current of each of the four quadrants is output to the DCDC module 202 separately, and the DCDC module 202 charges the battery after voltage stabilization, and then to supply power for the electrical equipment 204.

Figure 2:
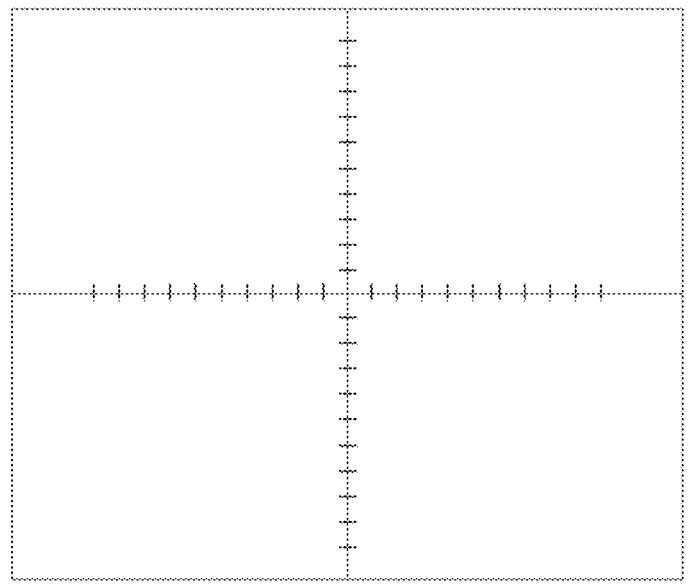
FIG. 2 is the schematic diagram of the coordinate scale marked with the actual length on the center lines of the four-quadrant photovoltaic panel, according to exemplary examples of the present disclosure.

The coordinate scale of the actual length is marked on the center lines of the four-quadrant photovoltaic panel 201, as shown in FIG. 2.

The DCDC module 202 rectified boosts or bucks the output power of the four-quadrant photovoltaic panel 201, so as to realize a regulated output to charge the battery.

The battery stores the output power of the DCDC module 202 and supplies power to the electrical equipment.

The four-quadrant photovoltaic cell panel 201 adopts monocrystalline silicon, polycrystalline silicon, or three-junction gallium arsenide concentrating cells.

Figure 3:
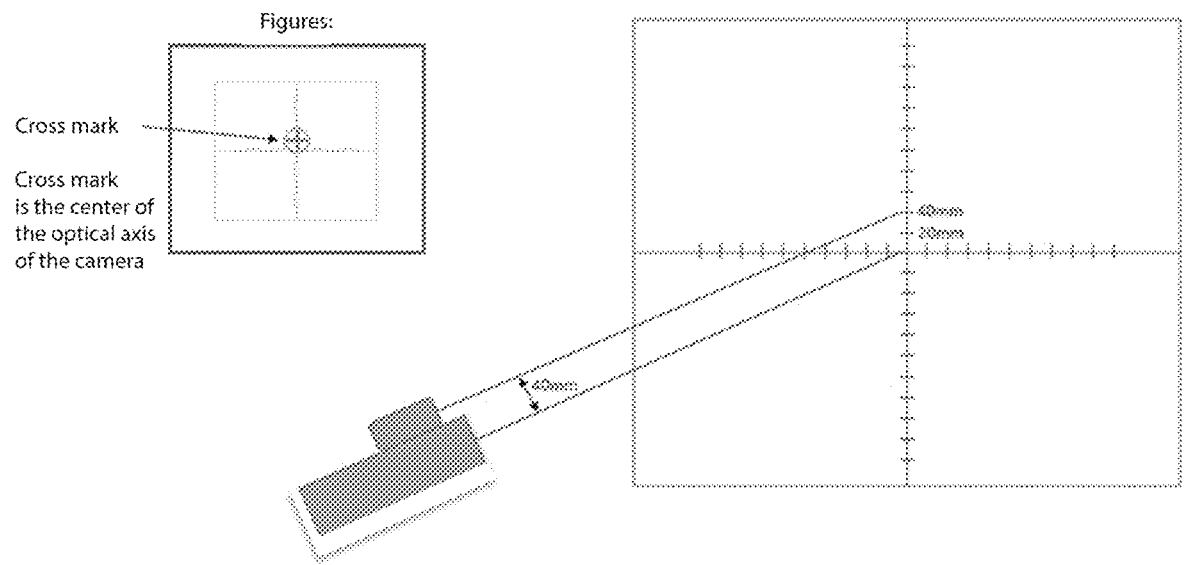
FIG. 3 is a schematic diagram of manually controlling the rotation of the two-dimensional pan-tilt, so that the cross mark representing the center of the image field of view is aligned with the scale d on the lines in the middle of quadrants 1 and 2 on the four-quadrant photocell board, according to exemplary examples of the present disclosure.

The present disclosure is based on the laser wireless power transmission method based on line power acquisition realized by the laser wireless power transmission device, and the method includes the following steps:

Step 1: Manually controlling the rotation of the two-dimensional pan-tilt 104, so that the center of the video image field of view is aligned with the preset position on the four-quadrant photocell panel 201, specifically:

Installing the laser wireless power transmission device, manually connecting to the transmitter remotely, turning on the semiconductor laser 102 and other device components, obtaining the video image captured by the current video image module 108, manually controlling the rotation of the two-dimensional pan-tilt 104, so that the cross mark representing the center of the image field of view is aligned with the scale d on the lines between the first and second quadrants on the quadrant photovoltaic panel 201, and d represents the actual distance between the optical axis of the video image module 108 and the output optical axis of the semiconductor laser 102, as shown in FIG. 3.

In FIG. 3, the optical axes of the camera and that of the laser are output in parallel, and the distance between the two above-mentioned optical axes is d. On the display screen of the camera, the center of the optical axis of the camera is marked with a cross cursor, and the cross cursor (the center of the optical axis of the camera) is aligned with the position of the quadrant center scale d of the four quadrants (the position of 40 mm in FIG. 3), which may align the invisible laser at the center of the four quadrants.

Step 2: adjusting the position of the internal lens of the beam shaping module 105, changing the laser spot size of the power receiver, and adjusting and enlarging the laser spot to basically cover the four-quadrant photovoltaic panel 201;

In details, the methods of the step of spot adjustment include:

Method I: automatically adjusting, according to the lens position calculated by theoretical simulation and the manually measured distance L between the power receiver and the power transmitter; wherein the distance L between the power receiver and the power transmitter refers to the distance between the position of the rotation center of the semiconductor laser 102 driven by the two-dimensional pan-tilt 104 and the center of the four-quadrant photovoltaic panel 201.

Figure 4:
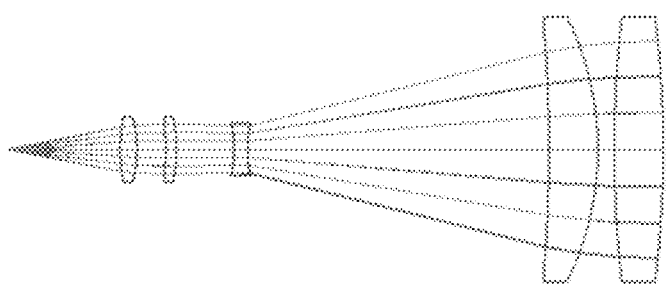
FIG. 4 is a schematic diagram of automatically adjusting the light spot at the receiver according to the lens position automatically calculated by theoretical simulation and the distance L manually adjusted between the receiver and the transmitter, according to exemplary examples of the present disclosure.

As shown in FIG. 4, there are various ways to achieve the specific optical path, which can be adjusted according to the requirements of different engineering scenarios.

Method II: observing the infrared spot through the video image module 108, manually adjusting the position of the internal lens of the beam shaping module 105, changing the size of the laser spot at the receiver, and adjusting and enlarging the laser spot to cover the four-quadrant photovoltaic panel 201.

The laser spot adjustment can be achieved by either one of the above-mentioned methods I or II.

Step 3: The control unit 106 calculates the output current difference of each quadrant of the four-quadrant photocell panel 201 in real time according to the PID algorithm and adjusts the rotation angle of the two-dimensional pan-tilt 104 so that the center of the laser spot may be irradiated on the center of the four-quadrant photocell panel 201, and records the spatial position information of the device components. Wherein, the two-dimensional refers to the rotation in the two dimensions: upward and downward, and left and right.

The details in explanation:

Turning on the semiconductor laser 102, and then the semiconductor laser 102 emits a laser beam, which is coupled by the optical fiber and then enters the beam shaping module 105 from the fiber output head or the fiber output head, and then irradiates the four-quadrant photocell panel 201 after beam shaping.

Figure 5:
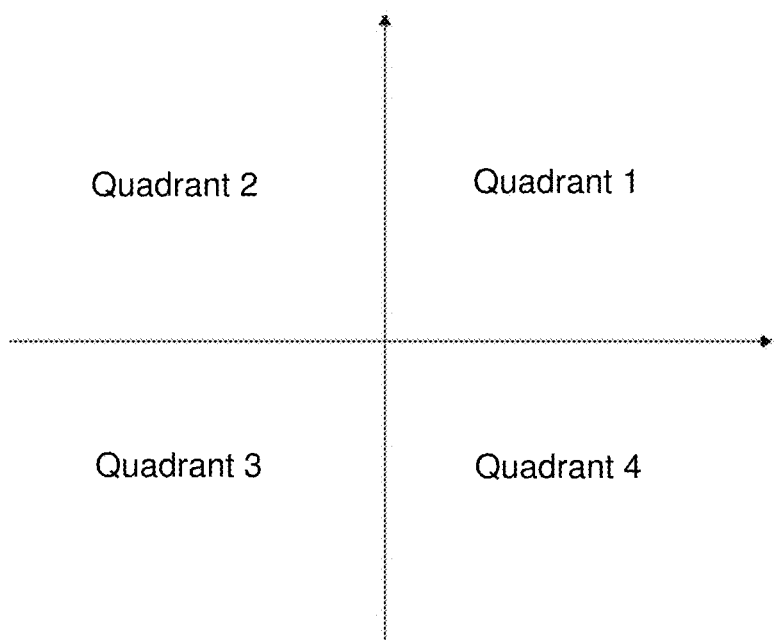
FIG. 5 is the azimuth diagram of 1 to 4 four quadrants of the present disclosure.

After the four-quadrant photovoltaic panel 201 is irradiated by the laser, the four quadrants start to output current, and the output currents of each of the four quadrants 1 to 4 are recorded as $I_1$, $I_2$, $I_3$, $I_4$; the orientation of the four quadrants 1 to 4 are conventionally established, as shown in FIG. 5.

The wireless monitoring module 205 monitors $I_1$, $I_2$, $I_3$, $I_4$, and transmits $I_1$, $I_2$, $I_3$, I 4 to the control unit 106 at the transmitter in real time. The control unit 106 uses the PID algorithm to calculate the output current difference of each quadrant of the four-quadrant photovoltaic panel 201 in real time, and adjusts the rotation of the two-dimensional pan-tilt 104 in real time. By adjusting the direction of the two-dimensional pan-tilt 104, the control unit 106 drives the beam shaping module 105 to rotate, and then change the direction of laser irradiation, so that the center of the laser spot is positioned at the center of the four-quadrant photovoltaic panel 201, and the IMU module 109 records the spatial position information of the components at the moment.

In details, Step 3 includes:

Step 3.1: Calculating the adjustment parameter k:

$$k=I/P;$$

Wherein, P represents the maximum laser power of the semiconductor laser 102;

The definition and determination method of I are:

When the power transmission line 206 is stable, manually locating and aiming the center of the four-quadrant photovoltaic panel 201 through the video image, adjusting the beam shaping module 105 so that the laser spot covers the four-quadrant photovoltaic panel 201 (ie, executing Step 2), and adjusting the laser power of the semiconductor laser 102 to the maximum value P, and then the total output current I of the four-quadrant photovoltaic panel 201 at this time is measured;

The above-mentioned calculation principle is:

Before the system runs, the photoelectric conversion characteristics of the four-quadrant photovoltaic panel 201 are tested and calibrated.

For the output current I (unit A) of the four-quadrant photovoltaic panel 201, the laser irradiation power density ω (unit W/cm2), and the area S of the four-quadrant photovoltaic panel 201 irradiated by the laser, there are the following relationships:

$$I=k*\omega*S$$

k is a coefficient and represents the current value output by per unit area of the four-quadrant photovoltaic panel 201 under the condition of a certain laser irradiation power density.

$$k=I/\omega S$$

The value of k can be measured via experiments, so it can be considered as a known value. When 1 cm² is taken as the minimum calculation unit, it can be roughly considered that the current changes k (A) for every 1 cm change of the light spot on the four-quadrant photovoltaic panel 201.

Furthermore, as the laser irradiation power density ω=P/S, and then $$k=I/P$$

Therefore, after the device is installed, under the stable condition of the power line 206, the center of the four-quadrant photovoltaic panel 201 is aimed through video images, and the beam shaping module 105 is adjusted so that the laser spot covers the four-quadrant photovoltaic panel 201, and the laser power of the semiconductor laser 102 is adjusted to the maximum, and then the output current I of the four-quadrant photovoltaic panel 201 at this time is measured.

Skk=I/P The video image module 108 (such as a CCD sensor) monitors the laser spot video image, and then the laser coverage area can be calculated from the image. When the present disclosure is implemented, can be calculated according to $$Skk=I/P$$

So, it doesn't need to calculate S.

According to the I value and the maximum laser power P, k can be calculated.

Step 3.2: When the center of the laser spot is irradiated on the center of the four-quadrant photovoltaic panel 201, based on the PID algorithm, comparing and calculating the value of $\Delta I=I_1-I_2$; When $\Delta I>0$, the two-dimensional pan-tilt rotates to left (just rotate a small angle at a time, based on the PID algorithm to continuously rotate, check, and adjust), otherwise, rotate to right; that is, $I_1$ is the current in the first quadrant on the left, and $I_2$ is the current in the second quadrant on the right. If $I_1$ is greater than $I_2$ Large, it means that there is more light on the right side, so the beam moves to the left, otherwise it moves to the right.

When the power transmitter moves, and it needs to track and aim at the center of the four-quadrant photovoltaic panel 201, in order to ensure accurate rotation to achieve current balance, according to the relationship between the theoretical rotation angle $\Delta\theta$ and the current difference $\Delta I$, $\Delta\theta=\Delta I/kL$, the PID algorithm is used to gradually adjust the rotation angle of the two-dimensional pan-tilt 104 to reduce the value of $\Delta I$. When $\Delta I \leq k$, i.e., the laser spot irradiation area represented by the output current difference between the 1st and 2nd quadrants is less than 1 cm², it is considered that the irradiation areas of the 1st quadrant and the 2nd quadrant are basically equal, and the laser irradiation area has been relatively accurately maintained consistent in the left and right directions. In the process of actual design and implementation, the accuracy can be improved to a higher level according to the indicators of components such as the two-dimensional pan-tilt 104 and the laser.

Wherein L is the distance between the center of rotation of the laser emitting end (i.e., the position of the center of rotation of the semiconductor laser 102 driven by the two-dimensional pan-tilt 104) and the center of the four-quadrant photovoltaic panel 201.

Step 3.3: When the center of the laser spot is irradiated on the center of the four-quadrant photovoltaic panel 201, compare and calculate the value of $\Delta'I=I_3-I_2$, when $\Delta'I>0$, the two-dimensional pan-tilt rotate upward, otherwise, rotates downward.

When the transmitter moves, and it needs to track and aim at the center of the four-quadrant photovoltaic panel 201, in order to ensure accurate rotation to achieve current balance, according to the relationship between the theoretical rotation angle $\Delta\theta$ and the current difference $\Delta'I, \Delta\theta=\Delta'I/kL$, the PID algorithm is adopted to gradually adjust the rotation angle of the two-dimensional pan-tilt 104 (i.e., adjust the rotation angle $\Delta\theta$ of the two-dimensional gimbal 104 in the upward, downward, left, and right directions) to reduce the value of $\Delta'I$. When $\Delta'I \leq k$, i.e., the laser spot irradiation area represented by the output current difference between the 3rd and 2nd quadrants is less than 1 cm$^2$, it is considered that the irradiation areas of the 3rd quadrant and the 2nd quadrant are basically equal, and the laser irradiation area has been relatively accurately maintained consistent in the upward and downward directions. In the process of actual design and implementation, the accuracy can be improved to a higher level according to the indicators of components such as the two-dimensional pan-tilt 104 and the laser. According to the above-mentioned disclosure, it can be seen that Step 3.2 and Step 3.3 do not need the output current of the 4th quadrant.

After execution of Step 2, the center of the light spot is basically irradiated on the center of the four-quadrant photovoltaic panel 201. The objectives of performing step 3 are to: 1) to align the center more accurately; and 2), the transmitter moves to track and aim at the center of the four-quadrant photovoltaic panel 201.

Take Step 3.2 as an example to explain:

Step 3.2:

When the center of the laser spot irradiates on the center of the four-quadrant photovoltaic panel 201, compare and calculate the value of $\Delta I=I_1-I_2$, and when $\Delta I>0$, the transmitter turns to the left, otherwise, turn to the right, —which corresponds to the above-mentioned 1) objective.

When the transmitter moves and needs to track and aim at the center of the four-quadrant photovoltaic panel 201, according to the relationship between the theoretical rotation angle $\Delta\theta$ and the current difference $\Delta I$, $\Delta\theta=\Delta I/kL$, according to the PID algorithm, the rotation angle is gradually adjusted to decrease the value of $\Delta I$. When $\Delta I \leq k$, it is considered that the irradiated areas of quadrant 1 and quadrant 2 are equal, and the laser irradiated area on the left and right directions are consistent; —which corresponds to the above-mentioned objective 2).

Step 4: after completing the pre-adjustment of steps 1 to 3, the laser wireless power transmission device enters the normal state, the semiconductor laser 102 is turned off, and other device components are turned on. When the power supply conditions are met, the semiconductor laser 102 is turned on for wireless power supply.

The said satisfactory conditions satisfying for power supply refer to:

Condition 1: The device monitors the safety of the external environment via the safety management module 107, and the semiconductor laser 102 is turned on via manually controlling.

Condition 2: The device monitors the safety of the external environment via the safety management module 107 and monitors that the voltage of the battery 203 and the battery current of the four-quadrant photovoltaic panel 201 are lower than the user's set value or are in the period of charging and power supply.

If either of the above-mentioned condition 1 or condition 2 is satisfied, it means that the power supply condition is met.

In Step 4, after the semiconductor laser 102 is turned on, the semiconductor laser 102 emits a laser light beam, and irradiates the laser light beam from the fiber output head to the center of the four-quadrant photovoltaic panel 201 after coupling through an optical fiber.

The four-quadrant photovoltaic panel 201 receives the laser and outputs current, and the DCDC module 202 rectifies and boosts or bucks the output power of the four-quadrant photovoltaic panel 201 to ensure that the voltage is regulated output to the battery for charging, and the battery 203 stores electrical energy and supplies power to the electrical equipment 204;

The wireless monitoring module 205 monitors the voltage of the battery 203 on the tower and the current of the four-quadrant photovoltaic panel 201 in real time.

When the power supply conditions are no longer met (i.e., the external environment is unsafe, the semiconductor laser 102 is turned off manually, the wireless monitoring module 205 detects that the battery 203 is fully charged or the current of the four-quadrant photovoltaic panel 201 returns to above the user's set value, or it is in the period of non-charging during the power supply period), then the semiconductor laser 102 needs to be turned off.

In Step 4, when the semiconductor laser is turned on, and when the power line 206 waves or the wind deflects to drive the transmitter to move, causing the laser light spot to move or deviate from the four-quadrant photovoltaic panel 201, which affects the laser function or even causes laser danger, return to Step 3 to make the center of the laser light spot is always in the center of the four-quadrant photovoltaic panel 201 to realize dynamic tracking and irradiation.

When the semiconductor laser 102 is turned off, the automatic tracking irradiation function terminates due to the loss of the real-time output current data of the four-quadrant photovoltaic panel 201. When it is necessary to track again, the spatial position information of the components recorded by the IMU is retrieved when the center of the laser light spot is in the center of the four-quadrant photovoltaic panel 201, and then to calculate the spatial position of the four-quadrant photovoltaic panel 201. The four-quadrant photovoltaic panel 201 can be captured again through the rotation of the two-dimensional pan-tilt 104, and the tracking and aiming can be realized again by repeating Step 3.

Compared with the existing technologies, the beneficial effects of the present disclosure are that:

This disclosure resolves the problem that the online monitoring device on the tower cannot obtain solar power supply under extreme conditions; by applying on line power acquisition through CT, and wireless laser transmission of power, so that there is no power safety hazards; setting up a safety management and control module to monitor and protect, and stop emitting light immediately when someone enters the tower to ensure the safety of personnel; using video images to achieve manual observation and pre-aiming;

monitoring the status of the four-quadrant photovoltaic panel power supply system in real time through the wireless monitoring module and supplying power on demand. Fiber-coupled semiconductor lasers and fiber optic heads make the launch head lighter and more convenient, easier to adjust, and lower in cost. Adopting the four-quadrant photovoltaic panel scheme, the aiming is more accurate and easier, and the dynamic tracking aiming is realized, and avoiding the aiming deviation caused by wind deflection and galloping. In this disclosure, the user can also set the timing to turn on the semiconductor laser for charging and power supply, for example, charging and power supply during the low power consumption period at night to save costs.

Compared with the prior disclosure 1, the improvement of the present disclosure is that it adopts a fiber-coupled semiconductor laser, the laser transmitting head is an optical fiber head; it applies video images to realize manual pre-aiming and uses a four-quadrant photovoltaic panel to realize aiming and tracking aiming, which has practical feasibility, high conversion efficiency, low cost, small size and light weight, installation and aiming being simple, flexible and precise; It adapts IMU to record the spatial position, and provide position reference during recapture.

Compared with the prior disclosure 2, the improvements of the present disclosure lie in that: it adopts the high-voltage transmission line CT to obtain power and supply energy, the energy of the transmission line can be directly used to supply power for the laser, and the energy is wirelessly transmitted to the tower through the laser; the optical fiber is used to couple the semiconductor, and the laser is emitted through the output of the optical fiber, so that the emitting end is lighter and easier to adjust; it applies the light beam shaping module, adjusting the light spot, can be used to adjust the size of the area irradiated on the four-quadrant photovoltaic panel, which is suitable for different distances and the sizes of photocell, and can make full use of the photocell; it uses video images to realize manual pre-aiming, and the aiming is more convenient and accurate by adopting a four-quadrant photovoltaic panel scheme. The automatic tracking and aiming in the state of galloping and wind deviation is realized.

The applicant of the present disclosure has made a detailed illustration and description of the implementation examples of the present disclosure in conjunction with the accompanying drawings, but those skilled in the art should understand that the above implementation examples are only preferred implementations of the present disclosure, and the detailed description is only to help readers better to understand the spirit of the present disclosure rather than to limit the protection scope of the present disclosure, on the contrary, any improvement or modification made based on the spirit of the present disclosure shall fall within the protection scope of the present disclosure.

The invention claimed is:

1. A method for laser wireless power transmission based on power acquisition on power lines, which is achieved by a laser wireless power transmission device, and the device includes a power transmitter and a power receiver;

the power transmitter, hanging on a power transmission line (206), includes an on line induction power acquisition module (101), a semiconductor laser, a communication module, a two-dimensional pan-tilt, a beam shaping module, and a control unit;

the on line induction power acquisition module, positioned fixedly on the power transmission line for induction power acquisition, supplies power for the power transmitter; the semiconductor laser emits a laser beam from a fiber output head and the beam shaping module to a four-quadrant photovoltaic panel at the power receiver via fiber coupling; the fiber output head and the beam shaping module are arranged on the two-dimensional pan-tilt fixedly; the beam shaping module has a video image module and an IMU module fixedly positioned thereon; the control unit connects with the on line induction power acquisition module, the semiconductor laser, the communication module, the two-dimensional pan-tilt, the beam shaping module, the video image module, and the IMU module so as to realize laser wireless power transmission control;

the power receiver, installed on a tower, includes the four-quadrant photovoltaic panel, a DCDC module, a wireless monitoring module, and a tower end battery;

an output end of the power supply of the four-quadrant photovoltaic panel connects to an input end of the battery via the DCDC module, and an output end of the battery connects to an electrical equipment;

the wireless monitoring module real-time monitors an output voltage of the tower end battery and an outputting current of each quadrant of the four-quadrant photovoltaic panel;

the beam shaping module includes optical lenses and is provided with a safety management module thereon;

the safety management module monitors areas containing laser beams when the semiconductor laser be turned on; when the safety management module detects a person entering the monitored areas, an alarm is issued, and the control unit controls the semiconductor laser to stop emitting laser and allows laser to be emitted continuously to charging power until the person exits the monitored areas;

control modes of the working state of the semiconductor laser include:

i. manually controlling the semiconductor laser to be turned on or off;

ii. the control unit automatically controlling the semiconductor laser to be turned on or off based on the real-time monitoring data of the wireless monitoring module or preset charging and power supply time information;

iii. the control unit monitoring the safety conditions of the external environment through the safety management module, and automatically controlling the semiconductor laser to be turned on or off according to the safety conditions of the external environment;

wherein, the method for laser wireless power transmission based on power acquisition on power lines, comprising:

A. manually controlling the rotation of the two-dimensional pan-tilt, so that the center of the video image field of view is aligned with the preset position on the four-quadrant photocell panel, B. adjusting the position of the internal lens of the beam shaping module, changing the laser spot size of the power receiver, and adjusting and enlarging the laser spot to basically cover the four-quadrant photovoltaic panel, C. calculating, by the control unit, the output current difference of each quadrant of the four-quadrant photocell panel in real time according to the PID algorithm and adjusting the rotation angle of the two-dimensional pan-tilt so that the center of the laser spot is irradiated on the center of the four-quadrant photocell panel, and recording the spatial position information of the laser wireless power transmission device's components;

D. after completing the pre-adjustment of steps A to C, the laser wireless power transmission device enters a normal state, the semiconductor laser is turned off, and other device components are turned on; when the power supply conditions are met, turning on the semiconductor laser for wireless power supplying.

2. The method of claim 1, wherein:
an internal optical axis of the video image module is parallel to the output optical axis of the semiconductor laser;
a center of an image field of view has a cross or other mark, and the video image module is connected to the control unit through a signal line;
the IMU module is installed and positioned fixedly near the output end of the beam shaping module and is connected to the control unit through a signal line for measuring and recording the spatial motion and position of the laser wireless power transmission device's components.

3. The method of claim 2, wherein:
the four-quadrant photovoltaic panel is composed of four photovoltaic panels, which are positioned according to the positions of four quadrants and spliced together; a current of each of the four quadrants is output to the DCDC module separately, and a coordinate scale of an actual length is marked on center lines of the four-quadrant photovoltaic panel.

4. The method of claim 3, wherein:
the A further including:
installing the laser wireless power transmission device, manually connecting to the power transmitter remotely, turning on the semiconductor laser and other device's components, obtaining the video image captured by the current video image module, manually controlling the rotation of the two-dimensional pan-tilt, so that the cross mark representing the center of the image field of view is aligned with a scale d on the lines between the first and second quadrants on the quadrant photovoltaic panel, and d represents the actual distance between the optical axis of the video image module and the output optical axis of the semiconductor laser.

5. The method of claim 3, wherein:
in the B, wherein adjusting of the spot further including:
I. automatically adjusting according to lens position calculated by theoretical simulation and a manually measured distance L between the power receiver and the power transmitter; the distance L between the power receiver and the power transmitter refers to the distance between the position of the rotation center of the semiconductor laser driven by the two-dimensional pan-tilt and the center of the four-quadrant photovoltaic panel;
II. observing an infrared spot through the video image module, manually adjusting the position of the internal lens of the beam shaping module, changing the size of the infrared spot at the power receiver, and adjusting and enlarging the infrared spot to cover the four-quadrant photovoltaic panel;
the infrared spot adjustment can be achieved by either one of the above-mentioned I or II.

6. The method of claim 3, wherein:
In the C, turning on the semiconductor laser, and then the semiconductor laser emits a laser beam, which is coupled by the fiber and then enters the beam shaping module from the fiber output head, and then irradiates the four-quadrant photocell panel after beam shaping; after the four-quadrant photovoltaic panel is irradiated by the laser, the four quadrants start to output current, and the output currents of the four quadrants 1 to 4 are recorded as $I_1$, $I_2$, $I_3$, $I_4$;
the wireless monitoring module monitors $I_1$, $I_2$, $I_3$, $I_4$, and transmits $I_1$, $I_2$, $I_3$, $I_4$ to the control unit at the power transmitter in real time; the control unit uses the PID algorithm to calculate the output current difference of each quadrant of the four-quadrant photovoltaic panel in real time, and adjusts the rotation of the two-dimensional pan-tilt in real time; by adjusting the direction of the two-dimensional pan-tilt, the control unit drives the beam shaping module to rotate, and then change the direction of laser irradiation, so that the center of the laser spot is positioned at the center of the four-quadrant photovoltaic panel, and the IMU module records the spatial position information of the components at the moment.

7. The method of claim 6, wherein:
In the C, adjusting the rotation angle of the two-dimensional pan-tilt further including:
C1: Calculating the adjustment parameter k:

$k=I/P;$

Wherein, P represents the maximum laser power of the semiconductor laser;
a definition and determination method of I are:
when the power transmission line is stable, manually locating and aiming the center of the four-quadrant photovoltaic panel through the video image, adjusting the beam shaping module so that the laser spot covers the four-quadrant photovoltaic panel, and adjusting the laser power of the semiconductor laser to the maximum value P, and then the total output current I of the four-quadrant photovoltaic panel at this time is measured;
C2: when the center of the laser spot is irradiated on the center of the four-quadrant photovoltaic panel, based on the PID algorithm, comparing and calculating the value of $\Delta I=I_1-I_2$; when $\Delta I>0$, the two-dimensional pan-tilt rotates to left, i.e. rotates to in the first quadrant, otherwise, rotates to right, i.e. rotates to in the second quadrant;
when the power transmitter moves, and needs to track and aim at the center of the four-quadrant photovoltaic panel, according to the relationship between a theoretical rotation angle $\Delta\theta$ and the current difference $\Delta I$, $\Delta\theta=\Delta I/kL$, applying the PID algorithm to gradually adjust the rotation angle of the two-dimensional pan-tilt to reduce the value of $\Delta I$. When $\Delta I \leq k$, the irradiation areas of the 1st quadrant and the 2nd quadrant are considered as being equal, and the laser irradiation area maintains consistent in the left direction and right direction;
wherein, L is the distance between a position of the center of rotation of the semiconductor laser driven by the two-dimensional pan-tilt and the center of the four-quadrant photovoltaic panel;
C3: when the center of the spot is irradiated on the center of the four-quadrant photovoltaic panel, compare and calculate the value of $\Delta'I=I_3-I_2$, when $\Delta'I>0$, the two-dimensional pan-tilt rotates upward, i.e. rotates to the second quadrant, otherwise, the two-dimensional pan-tilt rotates downward, i.e. rotates to the third quadrant;
when the power transmitter moves, and needs to track and aim at the center of the four-quadrant photovoltaic panel, according to the relationship between the theoretical rotation angle $\Delta\theta$ and the current difference $\Delta'I, \Delta\theta = \Delta'I/kL$, applying the PID algorithm to gradually adjust the rotation angle of the two-dimensional pan-tilt to reduce the value of $\Delta'I$; when $\Delta'I \leq k$, it is considered that the irradiation areas of the third quadrant and the second quadrant are equal, and the laser irradiation area maintains consistent in the upward and downward directions, so as to achieve tracking and aiming at the center of the four-quadrant photovoltaic panel.

8. The method of claim 3, wherein:

the satisfactory conditions satisfying for power supply in the D are:

a. the device monitors the safety of the external environment via the safety management module, and the semiconductor laser is turned on via manually controlling;

b. the device monitors the safety of the external environment via the safety management module and monitors that the voltage of the battery and the battery current of the four-quadrant photovoltaic panel are lower than the user's set value or are in the period of charging and power supply;

if either of the above-mentioned a or b is satisfied, it means that the power supply condition is met.

9. The method of claim 3, wherein:

In the D, after the semiconductor laser is turned on, the semiconductor laser emits a laser light beam, and irradiates the laser light beam from the fiber output head to the center of the four-quadrant photovoltaic panel after coupling through a fiber;

the four-quadrant photovoltaic panel receives the laser light and outputs current, and the DCDC module rectifies and boosts or bucks the output power of the four-quadrant photovoltaic panel to ensure that the voltage is regulated output to the battery for charging, and the battery stores electrical energy and supplies power to the electrical equipment;

the wireless monitoring module monitors the voltage of the battery on the tower and the current of the four-quadrant photovoltaic panel in real time;

when the power supply conditions are no longer met, turning off the semiconductor laser.

10. The method of claim 9, wherein:

In the D, when the semiconductor laser is turned on, and when the power line waves or the wind deflects to drive the power transmitter to move, causing the laser spot to move or deviate from the four-quadrant photovoltaic panel, which affects the laser function or even causes laser danger, return to the C to make the center of the laser spot is always in the center of the four-quadrant photovoltaic panel to realize dynamic tracking and irradiation;

when the semiconductor laser is turned off, the automatic tracking irradiation function terminates due to the loss of the real-time output current data of the four-quadrant photovoltaic panel;

when it is necessary to track again, the spatial position information of the components recorded by the IMU module is retrieved when the center of the laser spot is in the center of the four-quadrant photovoltaic panel, and then to calculate the spatial position of the four-quadrant photovoltaic panel;

the four-quadrant photovoltaic panel can be captured again through the rotation of the two-dimensional pan-tilt, and the tracking and aiming can be realized again by repeating the C.

\* \* \* \* \*